(12) United States Patent
Langeman (10) Patent No.: US 8,486,504 B2
(45) Date of Patent: Jul. 16, 2013

(54) MULTILAYER MASKING TAPE

(75) Inventor: Gary D. Langeman, Leamington (CA)

(73) Assignee: Langeman Manufacturing Limited (CA)

( * ) Notice: Subject to any disclaimer, the term of this patent is extended or adjusted under 35 U.S.C. 154(b) by 175 days.

(21) Appl. No.: 13/046,116

(22) Filed: Mar. 11, 2011

(65) Prior Publication Data

US 2012/0231167 A1  Sep. 13, 2012

(51) Int. Cl.
 *B32B 9/00* (2006.01)
 *B32B 7/12* (2006.01)

(52) U.S. Cl.
 USPC .......... 428/40.1; 428/41.8; 428/343; 428/354

(58) Field of Classification Search
 USPC ................. 428/40.1, 41.8, 343, 354
 See application file for complete search history.

(56) References Cited

U.S. PATENT DOCUMENTS

| | | | |
|---|---|---|---|
| 2,210,233 A * | 8/1940 | De Lille Edward | 118/505 |
| 5,354,614 A * | 10/1994 | Cox et al. | 428/343 |
| 5,935,669 A | 8/1999 | Leeuwenburgh | |
| 6,270,886 B1 | 8/2001 | Ono et al. | |
| 6,284,319 B1 | 9/2001 | Langeman | |
| 6,635,334 B1 | 10/2003 | Jackson et al. | |
| 6,962,748 B2 | 11/2005 | Nickel | |
| 7,014,900 B2 | 3/2006 | Langeman | |
| 8,029,895 B1 | 10/2011 | Heysek | |
| 2004/0175527 A1 | 9/2004 | Shiota et al. | |
| 2008/0193723 A1 | 8/2008 | Dureiko | |

FOREIGN PATENT DOCUMENTS

GB  2349107 A  * 10/2000

OTHER PUBLICATIONS

International Search Report issued for PCT/CA2012/000108 mailed Apr. 20, 2012.
Written Opinion issued for PCT/CA2012/000108 mailed Apr. 20, 2012.

* cited by examiner

*Primary Examiner* — Victor Chang
(74) *Attorney, Agent, or Firm* — Banner & Witcoff, Ltd.

(57) ABSTRACT

A masking tape for use in applications where a coating material is applied to a surface for defining a sharp edge of the portion of the surface that is coated. A masking tape may include a reinforcing strip releasably attached to the non-adhesive side of conventional masking tape comprising a substrate with an adhesive layer on one side. The reinforcing strip extends longitudinally along the length of the substrate with one edge substantially aligned with, and preferably flush with, one longitudinal edge of the substrate and acts as a separate means to cut through a coating or film more efficiently than the masking tape alone, while subsequently leaving the masking tape in place until the preferred time of removal.

31 Claims, 5 Drawing Sheets

MULTILAYER MASKING TAPE

FIELD OF THE INVENTION

The present invention relates generally to masking tape, and more particularly to masking tape that is reinforced to prevent tearing while removing the masking tape.

BACKGROUND OF THE INVENTION

Masking tape is widely used by painters and others applying a coating to a surface in order to define a sharp edge on the portion of the surface to be coated. The tape protects a portion of the surface that is not to be coated. Conventional masking tape is longitudinally extended with first and second parallel longitudinal edges and a pressure-sensitive adhesive layer formed on one side of a substrate, or backing, which side we refer to as the bottom side. The adhesive layer permits the masking tape to be removably attached to a surface. The coating may then be applied to the surface so that the first longitudinal edge of the masking tape is also covered by the coating. The tape can then be removed, leaving a straight and well defined edge of the portion of the surface that is coated, corresponding to the position of the first longitudinal edge of the tape.

The pressure-sensitive adhesive is selected so that the tape can easily be removed from the surface. The substrate is typically made from paper and is hand-tearable. The tape is typically manufactured in rolls so that a user can unwind a length of tape and then hand-tear it transversely to remove a strip of tape from the roll.

The paper substrate may be saturated with a latex binder and then dried before the adhesive is applied in order to improve the tensile strength of the substrate to help prevent it from ripping when it is removed. A release coating may also be applied to the top side to facilitate removing tape from a roll.

"Crepe" paper is sometimes used as an effective substrate in masking tape because of its physical properties that make it advantageous over other substrates such as plastic film. The paper is easy to tear by hand while being thick enough and rigid enough to easily position and apply to a surface without flexing or curling.

Such masking tape is typically manufactured in relatively wide sheets that may be cut into narrow widths, such as one inch, and then fed to a rewinder for rolling onto a number of cores to form rolls.

A common problem with paper-based masking tape is that the tape may tear when it is being removed from a coated surface, for example if the coating has been allowed to dry and form a strong membrane. This may happen because of the use of multiple coats, or because of the quality of the coating material. In some cases, the paint membrane may be fractured in a manner that ruins the finished edge. Various methods have been devised to produce tape with enhanced tensile strength to help ameliorate these issues, such as by using plastic film substrates, but these approaches drive up the cost of tape substantially relative to paper-based tape.

SUMMARY OF THE INVENTION

The present invention provides a masking tape having:
a. an elongated base substrate having top and bottom sides and first and second longitudinal edges;
b. a base adhesive layer being a pressure-sensitive adhesive layer formed on the bottom side of the base substrate; and
c. a first reinforcing strip adhered to the top side of the base substrate, the first reinforcing strip having an outer edge, wherein the reinforcing strip has a longitudinal extent co-extensive with that of the base substrate and a width no more than half that of the base substrate, and wherein the reinforcing strip is positioned on the base substrate so that the outer edge of the reinforcing strip is substantially aligned with the first longitudinal edge of the base substrate over the longitudinal extent of the base substrate.

The top side of the base substrate may have a release coat formed thereon with the reinforcing strip being adhered to the release coat.

The outer edge of the reinforcing strip may be less than 0.04 inches from the first longitudinal edge of the base substrate, or it may be flush with the first longitudinal edge of the base substrate.

The tape may further include a filament having a longitudinal extent co-extensive with that of the base substrate, the filament being positioned between the base substrate and the reinforcing strip so that the filament is substantially aligned with the first longitudinal edge of the base substrate over the longitudinal extent of the base substrate. The filament may be less than 0.04 inches from the first longitudinal edge of the base substrate. The filament may be made of an elastic synthetic material and have a diameter of 0.002 to 0.005 inches.

There may be perforations through the reinforcing strip wherein the perforations are spaced apart in the longitudinal direction so that the tape is hand-tearable. There may be at least two perforations at each longitudinal position having a perforation. The perforations may have a transverse width of 10% to 50% of the width of the reinforcing strip and be spaced apart longitudinally by 0.1 to 0.5 inches.

The reinforcing strip may have transverse scores through its top side (i.e. the side that is not adhered to the top side of the base substrate), the scores being spaced apart along its longitudinal extent, and having a depth sufficient to weaken the reinforcing strip to be hand-tearable.

A second reinforcing strip may be adhered to the top side of the base substrate, the second reinforcing strip having a longitudinal extent co-extensive with that of the base substrate and a width no more than one-half that of the base substrate, wherein the second reinforcing strip is positioned on the base substrate so that one edge of the second reinforcing strip is substantially aligned with the second longitudinal edge of the base substrate over the longitudinal extent of the base substrate.

The thickness of the base substrate may be between 0.001 inches and 0.008 inches or between 0.002 inches and 0.006 inches.

The thickness of the base adhesive layer may be between 0.0003 inches and 0.003 inches or between 0.0005 inches and 0.002 inches.

The thickness of the reinforcing strip may be between 0.001 and 0.004 inches.

The first reinforcing strip may include a reinforcing strip substrate layer and a reinforcing strip adhesive layer for attaching the reinforcing strip to the base substrate, wherein the reinforcing strip is removably adhered to the base substrate.

The reinforcing strip substrate layer may be a plastic film made of polyester, polyolefin, vinyl chloride or nylon, which polyester may be biaxially-oriented polyethylene terephthalate.

A removably adhered reinforcing strip may also have perforations through the reinforcing strip substrate layer wherein the perforations are spaced apart in the longitudinal direction so that the tape is hand-tearable. There may be at least two perforations at each longitudinal position having a perforation, and the perforations may have a width of 10% to 50% of the width of the reinforcing strip and be spaced apart longitudinally by 0.1 to 0.5 inches. The removable reinforcing strip may alternatively have transverse scores through its non-adhesive side (i.e. the side not adhered to the top side of the base substrate), the scores being spaced apart along its longitudinal extent, and having a depth sufficient to weaken the reinforcing strip to be hand-tearable.

The tape may also have a second reinforcing strip removably adhered to the first reinforcing strip, the second reinforcing strip having a longitudinal extent co-extensive with that of the base substrate, wherein the second reinforcing strip is positioned on the first reinforcing strip so that one edge of the second reinforcing strip is substantially aligned with the first longitudinal edge of the base substrate over the longitudinal extent of the base substrate. The second reinforcing strip may have a width less than that of the first reinforcing strip.

The materials used to form the base substrate and reinforcing strip may be selected so the tape is hand-tearable.

The tensile strength of the reinforcing strip may be greater than the tensile strength of the base substrate.

The width of the reinforcing strip may be between 0.03 and 0.5 inches, or may be between 0.06 and 0.125 inches.

There is also provided a method of coating a portion of a surface with a coating material by performing the steps of:
  a. affixing to the surface a masking tape comprising an elongated base substrate having top and bottom sides and first and second longitudinal edges, with a pressure-sensitive adhesive layer formed on the bottom side of the base substrate and a first reinforcing strip adhered to the top side of the base substrate, the first reinforcing strip having an outer edge, wherein the reinforcing strip has a longitudinal extent co-extensive with that of the base substrate and a width no more than half that of the base substrate, and wherein the reinforcing strip is positioned on the base substrate so that the outer edge of the reinforcing strip is substantially aligned with the first longitudinal edge of the base substrate over the longitudinal extent of the base substrate, wherein the first longitudinal edge of the base substrate defines an edge of the portion of the surface to be coated;
  b. applying coating material to the portion of the surface and over the outer edge of the reinforcing strip;
  c. allowing the coating material to at least partially dry or cure; and
  d. removing the masking tape.

There is further provided a method of coating a portion of a surface with a coating material by performing the steps of:
  a. affixing to the surface a masking tape comprising an elongated base substrate having top and bottom sides and first and second longitudinal edges, with a pressure-sensitive adhesive layer formed on the bottom side of the base substrate and a first reinforcing strip removably adhered to the top side of the base substrate, the first reinforcing strip having an outer edge, wherein the reinforcing strip has a longitudinal extent co-extensive with that of the base substrate and a width no more than half that of the base substrate, and wherein the reinforcing strip is positioned on the base substrate so that the outer edge of the reinforcing strip is substantially aligned with the first longitudinal edge of the base substrate over the longitudinal extent of the base substrate, the reinforcing strip having sufficient tensile strength to cut the coating material when it is at least partially dried or cured, wherein the first longitudinal edge of the base substrate defines an edge of the portion of the surface to be coated;
  b. applying coating material to the surface and over the outer edge of the reinforcing strip;
  c. allowing the coating material to at least partially dry or cure; and
  d. removing the reinforcing strip.

There is provided a method of coating a portion of a surface with a coating material by performing the steps of:
  a. affixing to the surface a masking tape comprising an elongated base substrate having top and bottom sides and first and second longitudinal edges with a pressure-sensitive adhesive layer formed on the bottom side of the base substrate, a first reinforcing strip removably adhered to the top side of the base substrate, the first reinforcing strip having an outer edge, wherein the first reinforcing strip has a longitudinal extent co-extensive with that of the base substrate and a width no more than half that of the base substrate, and wherein the first reinforcing strip is positioned on the base substrate so that the outer edge of the reinforcing strip is substantially aligned with the first longitudinal edge of the base substrate over the longitudinal extent of the base substrate, the first reinforcing strip having sufficient tensile strength to cut the coating material when it is at least partially dried or cured, and with a second reinforcing strip adhered to the top side of the first reinforcing strip, the second reinforcing strip having an outer edge, the second reinforcing strip having a longitudinal extent co-extensive with that of the base substrate and a width no more than that of the first reinforcing strip, wherein the second reinforcing strip is positioned on the first reinforcing strip so that the outer edge of the second reinforcing strip is substantially aligned with the first longitudinal edge of the base substrate over the longitudinal extent of the base substrate, the second reinforcing strip having sufficient tensile strength to cut the coating material when it is at least partially dried or cured, wherein the first longitudinal edge of the base substrate defines an edge of the portion of the surface to be coated;
  b. applying a first coat of coating material to the portion of the surface and over the outer edge of the second reinforcing strip;
  c. allowing the coating material to at least partially dry or cure;
  d. removing the second reinforcing strip;
  e. applying a second coat of coating material to the portion of the surface and over the outer edge of the first reinforcing strip;
  f. allowing the coating material to at least partially dry or cure; and
  g. removing the first reinforcing strip.

There is further provided a method of manufacturing a strip of masking tape by performing the steps of:
  a. forming a layer of pressure-sensitive adhesive on one side of an elongated base substrate; and
  b. adhering a reinforcing strip to the other side of the base substrate, the reinforcing strip having an outer edge, wherein the reinforcing strip has a longitudinal extent co-extensive with that of the base substrate and a width no more than half that of the base substrate, and wherein the reinforcing strip is positioned on the base substrate so that the outer edge of the reinforcing strip is substantially aligned with a longitudinal edge of the base substrate over the longitudinal extent of the base substrate.

There is further provided a method of manufacturing a strip of masking tape by performing the steps of:
  a. adhering a reinforcing strip to one side of an elongated base substrate, the reinforcing strip having an outer edge, wherein the reinforcing strip has a longitudinal extent co-extensive with that of the base substrate and a width no more than half that of the base substrate, and wherein the reinforcing strip is positioned on the base substrate so that the outer edge of the reinforcing strip is substantially aligned with a longitudinal edge of the base substrate over the longitudinal extent of the base substrate; and b. forming a layer of pressure-sensitive adhesive on the other side of the base substrate.

There is further provided a method of manufacturing N strips of masking tape with an average width of Wa from a longitudinally extended web of base substrate of width N times Wa having top and bottom sides, a longitudinal axis and two longitudinal edges, where N is an integer greater than 1, by performing the steps of:

a. applying a pressure-sensitive adhesive to the bottom side of the web of base substrate to form a base adhesive layer;

b. adhering N/2 reinforcing strips, each having two longitudinal edges and a width less than Wa, to the web of base substrate so that the reinforcing strips are parallel to the longitudinal axis of the web of base substrate, the centers of the reinforcing strips are spaced apart by a distance of at least Wa, and no longitudinal edge of a reinforcing strip is a distance of less than Wa/2 from either longitudinal edge of the web of base substrate; and c. cutting through the reinforcing strips, web of base substrate and the base adhesive layer along N/2 reinforcing strip cut lines parallel to the longitudinal axis of the web of base substrate, one of which reinforcing strip cut lines is located on each reinforcing strip, and cutting through the base substrate and the base adhesive layer at N/2−1 base substrate cut lines parallel to the longitudinal axis of the web of base substrate, one of which base substrate cut lines is positioned between each pair of reinforcing strips located nearest each other, each base substrate cut line being at least a distance of Wa/2 away from the center of any reinforcing strip.

In this method, Wa may be between 0.25 and 40 inches and N times Wa no more than 120 inches. The reinforcing strips may be regularly spaced across the width of the web of base substrate so that N strips of width Wa of masking tape are produced. All the reinforcing strip cut lines and base substrate cut lines may be cut simultaneously by N−1 regularly spaced blades. The method may further include the step of rewinding each strip of masking tape onto a core to form a roll of masking tape.

BRIEF DESCRIPTION OF THE DRAWINGS

The drawings are not drawn to scale.

DETAILED DESCRIPTION

Figure 1:
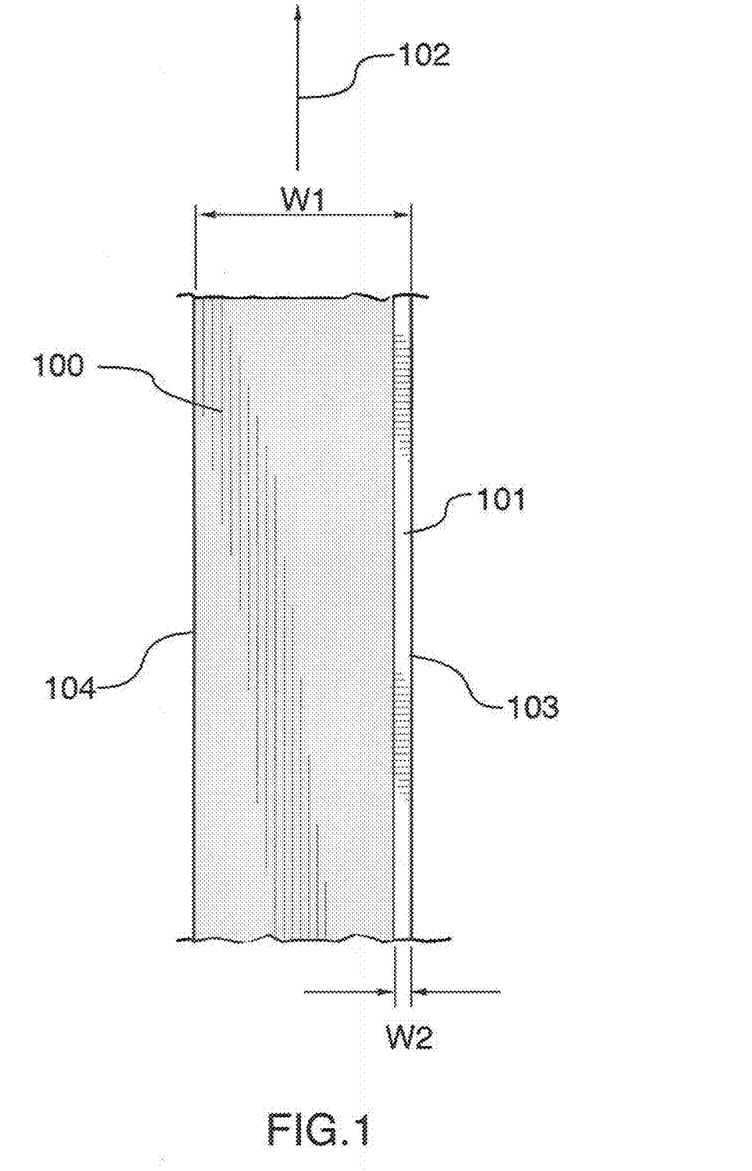
FIG. 1 is a plan view of a strip of a preferred embodiment of the masking tape.
Figure 2:
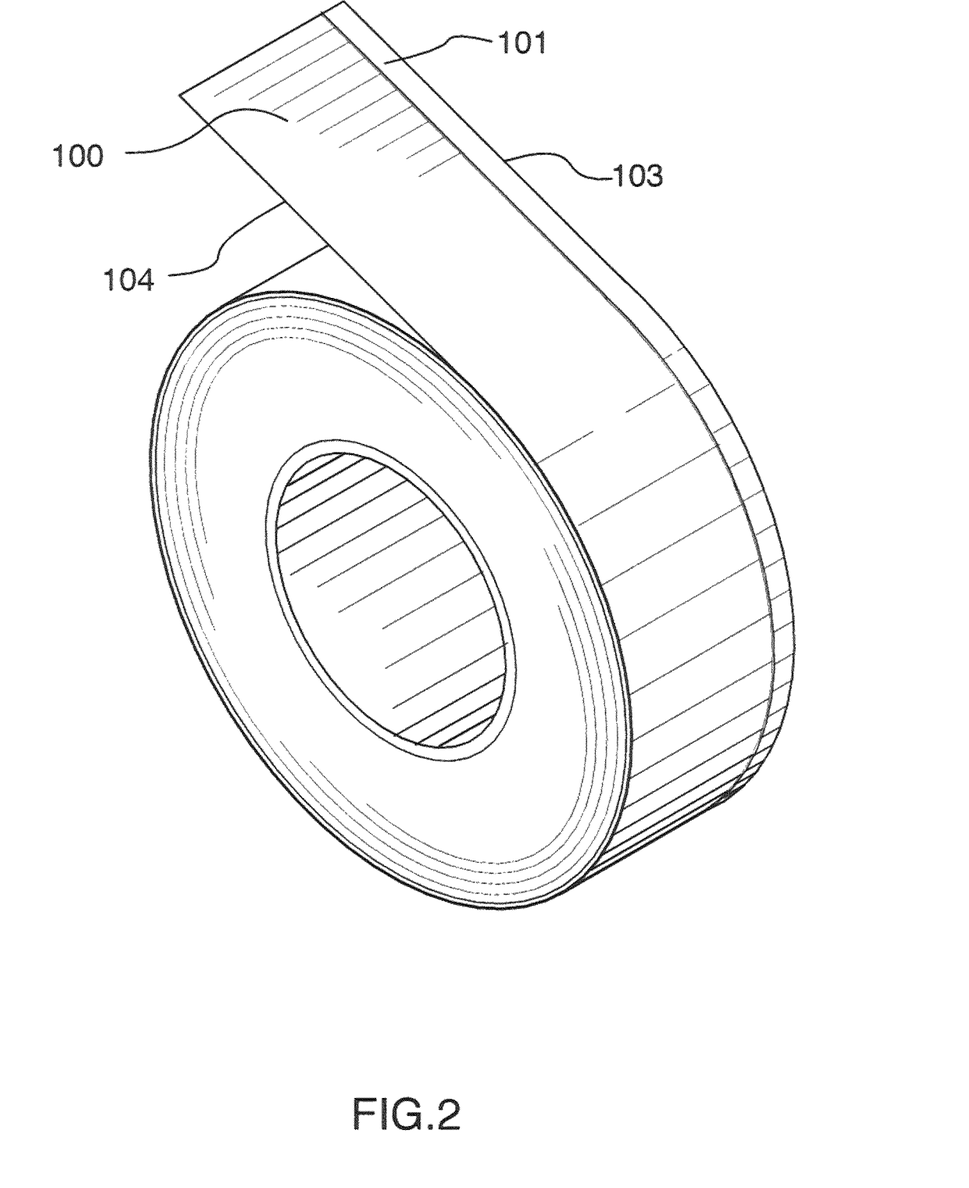
FIG. 2 is a perspective view of a roll of an embodiment of the masking tape.
Figure 3:
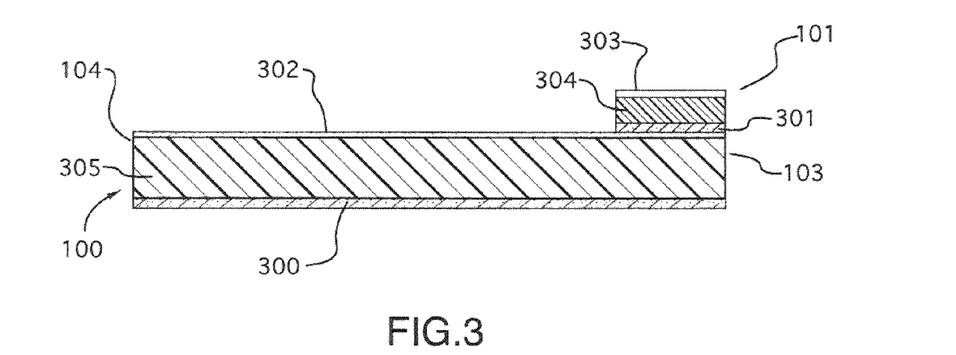
FIG. 3 is a cross-sectional view of a piece of tape having release coats formed on the base substrate and reinforcing strip substrate.

One embodiment of the invention is shown in FIG. 1 which depicts a portion of an elongated strip of masking tape consisting of an elongated base tape 100 of width W1 with a reinforcing strip 101 adhered to, or formed on, the top side, or surface, of the base tape 100. A pressure-sensitive base adhesive layer 300 is formed on the bottom side of a base substrate 305 as shown in FIG. 3, which shows a cross-section through the tape in the transverse direction (perpendicular to the longitudinal axis 102). There may also be a base release coat 302 formed on the top (back) side of the base substrate 305 in order to facilitate removal of a strip of tape from a roll. Generally, the "base", or "base tape", 100 refers to the base substrate 305 with a base adhesive layer 300 formed on the bottom side of the base substrate 305, and optionally with a base release coat 302 formed on the top, or non-adhesive, side of the base substrate 305. The base tape 100 may be conventional masking tape. Typically, the masking tape is rewound, generally onto a core, to form a roll of tape as depicted in FIG. 2.

The reinforcing strip 101 has a reinforcing strip substrate layer 304 and a reinforcing strip adhesive layer 301 formed on the bottom side of the reinforcing strip substrate layer 304 for securing the reinforcing strip 101 to the non-adhesive side of the base tape 100. The reinforcing strip 101 may also have a reinforcing strip release coat 303 in order to facilitate removal of a strip of tape from a roll of tape.

The base tape 100 has a first longitudinal edge 103 and a second longitudinal edge 104. In embodiments with a reinforcing strip on only one side, the edge on that side will be referred to as the first longitudinal edge 103, although there is generally no physical difference between the two edges. The reinforcing strip 101 is adhered to the non-adhesive side of the base tape so that it is positioned on the base tape with one longitudinal edge of the reinforcing strip 101, referred to as the outer edge, substantially aligned with the first longitudinal edge 103 of the base tape 100 over the longitudinal extent of the base tape 100. Both longitudinal edges 103, 104 of the base tape 100 and reinforcing strip 101 generally extend parallel to the longitudinal axis 102 of the base tape 100.

By being substantially aligned, it is meant that the outer longitudinal edge of the reinforcing strip 101 and first longitudinal edge 103 of the base tape 100 align sufficiently closely that they effectively define the same demarcation line on a surface to which the tape is to be adhered for the purpose of applying a coating. This may mean that the outer longitudinal edge of the reinforcing strip 101 is less than 0.04 inches from, and preferably less than 0.01 inches from, and more preferably flush with, the first longitudinal edge 103 of the base tape 100 at all points along its length.

The material for the base adhesive layer 300 is selected so that the masking tape will stick to surfaces, such as wood, metal, concrete, plastic, fiber board, or plaster surfaces, which may or may not already be coated, for example with one or more layers of paint, so that the tape removably adheres to the surface. Conventional masking tape has been widely used in applications such as painting walls to create a sharp paint edge between the wall and the frame of a window for example. The invention may employ any of the materials and compositions generally used in such prior art for the base substrate 305, adhesive layers and release coats, if employed. For example, a typical material used for the base substrate 305 is paper. The adhesive could be a natural or synthetic rubber or an acrylic compound, for example. The base tape to which the reinforcing strip is applied can be any type of pressure-sensitive adhesive tape including, but not limited to, conventional masking tape, duct tape, and reinforced or non-reinforced packaging and sealing tape.

The width, or transverse extent, of a strip of tape, W1 as shown in FIG. 1, is selected to be large enough to facilitate the application of a coating using a usual coating mechanism, such as a paint brush. For a typical painting application W1 may be about one inch for example.

The width, or transverse extent, of the reinforcing strip 101, referred to as W2 as shown in FIG. 1, is generally, but not necessarily, selected to be no more than one-half of W1 (W1/2). One purpose served by the reinforcing strip is to strengthen the first longitudinal edge 103 of the base tape 100 to reduce the likelihood that the tape will tear when it is removed because of a coating that has at least partially dried or cured before the tape is removed. This purpose may be served by making the reinforcing strip substrate 304 out of any suitable material. For example, it could be the same material as the base substrate 305, or a stronger material, such as a polyolefin-based composition.

A portion of a surface may then be coated with a coating material by first affixing the masking tape to the surface so that the first longitudinal edge 103 of the base tape 100 defines an edge of the portion of the surface to be coated. The coating may then be applied to the surface so that it is also applied over the reinforcing strip 101, so that the outer edge of the reinforcing strip 101 along the first longitudinal edge 103 of the base tape 100 is covered with the coating, and the coating may then be allowed to at least partially dry or cure. The base tape 100 and reinforcing strip 101 may then be removed from the surface together by removing the masking tape as one would remove conventional masking tape, and the additional tensile strength provided by the reinforcing strip 101 along the coated edge will help to prevent tearing of the tape.

In a preferred embodiment of the invention, the reinforcing strip 101 is removably adhered to the base tape 100, for example using a pressure-sensitive reinforcing strip adhesive layer 301 similar to that used for the base adhesive layer 300, to attach the reinforcing strip substrate 304 to the non-adhesive side of the base tape 100. There may also be a reinforcing strip release coat 303 on the top (non-adhesive) side of the reinforcing strip substrate 304 in order to facilitate removal of a strip of tape from a roll. The reinforcing strip substrate 304 is preferably made of a material having a greater tensile strength than that of the base substrate 305. For example the reinforcing strip substrate 304 may be a plastic film, such as a polyester, polyolefin, polyvinyl chloride, vinyl chloride or nylon based film. Biaxially-oriented polypropylene, mono-axially-oriented polypropylene, biaxially-oriented polyethylene terephthalate or high-density polyethylene may be employed, for example. A copolymer such as propylene with ethylene, or polypropylene with polyethylene could also be used.

Generally, the material used to make the reinforcing strip 101 is selected so that the tensile strength of a reinforcing strip 101 is sufficient to cut any coating material that the masking tape is designed to be used with when that coating material is at least partially dried or cured, or when it is fully dried or cured. For example, a very high strength may be desirable for uses such as the application of stucco to surfaces, interior and exterior, concrete or various other hard surfaces, which may also require more aggressive adhesives.

A portion of a surface may then be coated with a coating material by first affixing the masking tape to the surface so that the first longitudinal edge 103 of the base tape 100 defines an edge of the portion of the surface to be coated. The coating may then be applied to the surface so that it is also applied over the outer edge of the reinforcing strip 101, so that a continuous segment of the outer edge of the reinforcing strip 101 aligned with the first longitudinal edge 103 of the base tape 100 is covered with the coating, and the coating may then be allowed to at least partially dry or cure. Then the reinforcing strip 101 may be removed from the base tape 100, while leaving the base tape 100 still affixed to the surface. This may be done, for example, by using a fingernail to separate a portion of the reinforcing strip 101 from the base tape 100 sufficiently large for the user to grasp that portion between a thumb and finger, so that the user may then grasp and pull the reinforcing strip 101 to remove it.

The use of a reinforcing strip 101 with a relatively narrow width helps to ensure that the coating does not fracture to leave a jagged edge, and that the coating, or membrane, will be cut through cleanly, leaving an undisturbed base tape 100 (being essentially a typical prior art masking tape after removal of the reinforcing strip 101) affixed to the surface. The remaining base tape 100 can then be removed without incident. The reinforcing strip 101 could be removed after one or two coats, for example, and then the base tape 100 could be removed after a final coat.

When used in this manner, the invention allows the application of multiple coats of coating material without needing to re-mask the surface. Re-masking can be costly and reduce the quality of the resulting coating edge. For example, for certain applications, masking tape is used with an additional masking film pre-attached that can be used to shield a larger area, for example, when spray painting automobiles or automobile parts (as, for example, in U.S. Pat. No. 6,962,748 by O. Nickel). Such masking tape is relatively expensive so that re-masking is undesirable for cost reasons. Such a film could be used in conjunction with the present invention and the benefit of the added film could be enjoyed for multiple coats by removing one or more reinforcing strips between coats. Using the current invention, the cost of adding a reinforcing strip, for example to a single strip of tape 66 yards in length, could be as little as $0.05.

Also, when re-masking, the quality of the resulting coating edge is reduced because it is nearly impossible to position the masking tape in exactly the same place as it was during the previous coat. As a result, the demarcation line changes each time masking tape is re-applied.

Another advantage of a removable reinforcing strip 101 is that, if the coating should fracture upon removing the reinforcing strip, by having the base tape still affixed to exactly the same position on the surface, an additional coat can be applied using the base tape to correct the fractured edge.

For a typical painting application, the reinforcing strip 101 may be made of a hand-tearable material so that the user may tear the tape transversely, as is done with conventional masking tape. For certain applications, such as where stronger coatings are employed, such as polyurethane, acrylics, silicones or parylene, a stronger material, such as monoaxially-oriented polypropylene, may be preferred for the reinforcing strip substrate 304, with the reinforcing strip 101 having a relatively narrow width. This may be useful for applications such as trimming spray-on truck bed liners and conformal coatings applied to printed circuit boards, for example.

W2 is usually selected to be at least 0.06 inches, and preferably about 0.125 inches, to facilitate removal, since narrower widths may be more difficult for a person to separate from the base tape and pull with their fingers. Smaller or larger widths, such as in the range of 0.03 to 0.5 inches, may be preferred for certain applications though.

The thickness of the base substrate 305 is generally between 0.001 inches and 0.008 inches, with a range of between 0.002 inches and 0.006 inches preferred for a typical painting application. The thickness of the base adhesive layer 300 is generally between 0.0003 inches and 0.003 inches, and preferably between 0.0005 inches and 0.002 inches.

The reinforcing strip 101 is preferably relatively thin compared to the base tape 100, such as between 0.001 and 0.004 inches, which helps prevent telescoping when the masking tape is on a roll, and also facilitates rewinding the tape onto rolls. For example, the thickness of a reinforcing strip 101 made from biaxially-oriented polyethylene terephthalate film may be less than 0.002 inches, with the reinforcing strip substrate 304 being less than 0.0005 inches thick.

Embodiments employing more than one reinforcing strip on a base tape are also within the scope of the invention. In one embodiment a second reinforcing strip may be removably adhered to the non-adhesive side of the base tape 100, so that the outer edge of the second reinforcing strip is substantially aligned with, and preferably flush with, the second longitudinal edge 104 of the base tape 100 over the longitudinal extent of the base tape 100. The second reinforcing strip may have a longitudinal extent co-extensive with that of the base tape 100 and a width no more than one-half that of the base tape 100 so that the first and second reinforcing strips do not overlap. Preferably the second reinforcing strip is composed of the same materials and has the same width as the first reinforcing strip 101.

In an embodiment where both reinforcing strips are one-half the width of the base tape 100, the top surface of the base tape 100 is fully covered by the two reinforcing strips. Such an embodiment may be produced, for example, by adhering reinforcing strip material to a base tape 100 where the widths of the reinforcing strip material and base tape 100 are the same, and then cutting the reinforcing strip material longitudinally along the center of the reinforcing strip material so that the reinforcing strip material is cut into two separate or separable reinforcing strips, but without cutting into the base substrate 305 enough to significantly weaken it. Such an embodiment may be most effective for applications employing a relatively narrow tape, for example having a total width of less than one inch, or less and one-half inch. This approach also reduces any concern due to the varying thickness of the tape in relation to rewinding and telescoping when the tape is on a roll, and it is not important in such an embodiment that the thickness of the reinforcing strip be relatively small compared to that of the base tape 100.

In another embodiment, a second reinforcing strip may be removably adhered to a first reinforcing strip 101 formed on the top side of the base tape 100. The second reinforcing strip may have a longitudinal extent co-extensive with that of the base tape 100. Although it is not essential, the second reinforcing strip may have a width no greater than that of the first reinforcing strip 101. The second reinforcing strip is positioned on the non-adhesive side of the first reinforcing strip 101 so that the outer edge of the second reinforcing strip is substantially aligned with, and preferably flush with, the first longitudinal edge 103 of the base tape 100 over the longitudinal extent of the base substrate. The second reinforcing strip is preferably made of the same materials as the first reinforcing strip 101. Preferably the width of the second reinforcing strip is less than that of the first reinforcing strip 101 to facilitate removal of the second reinforcing strip without removing the first reinforcing strip 101. For example, the first reinforcing strip 101 may be 0.25 inches wide and the second reinforcing strip 0.125 inches wide.

The resulting tape is effective for defining an edge of a portion of a surface to be coated by two or more coats of coating material. After the tape is adhered to the surface, a first coat of coating material may be applied to the surface and over the second reinforcing strip, generally covering the outer edge of the second reinforcing strip, along its length. After allowing the coating material to at least partially dry or cure, the second reinforcing strip can then be removed. Then another coat of coating material may be applied to the surface and over the outer edge of the first reinforcing strip 101. After allowing the coating material to at least partially dry or cure, the first reinforcing strip 101 can then be removed, or, alternatively, the base tape and first reinforcing strip 101 can be removed together.

Figure 7:
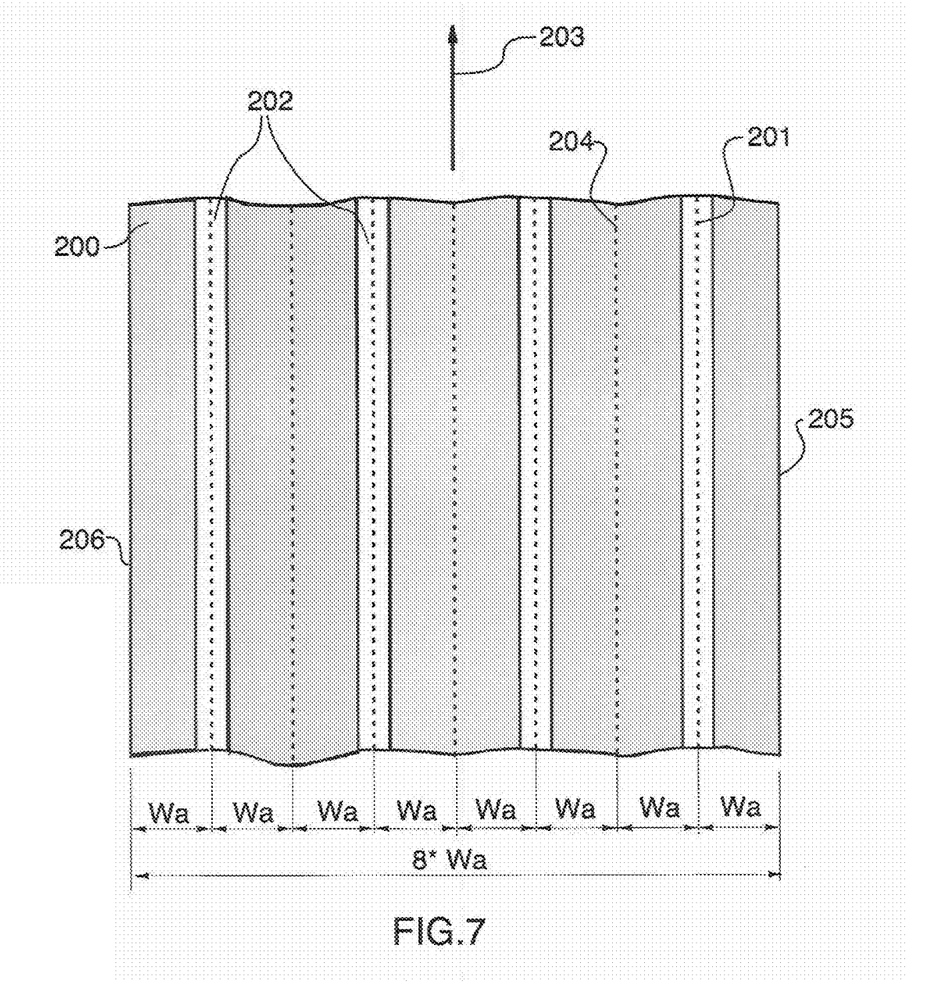
FIG. 7 is a plan view of a sheet of base substrate with multiple reinforcing strips attached thereto, depicting cutting lines for a method of manufacturing the masking tape.

A number, N, of strips, or rolls, of masking tape may be manufactured from a longitudinally extended web of base substrate 200, where N is an integer greater than 1 and generally less than 100. The average width of a strip of masking tape to be produced from the web of base substrate 200 is denoted by Wa. Normally Wa will be equal to the width of all N strips, but it is possible that strips with varying widths could be produced from the same web of base substrate 200. Generally Wa will be between 0.25 and 40 inches, and more usually between 0.5 and 4 inches. The width of the web of base substrate 200, which is equal to N multiplied by Wa, will generally be no more than 120 inches.

A portion of a web of base substrate 200, where N equals 8, of width 8 times Wa (8*Wa), is shown in FIG. 7. Such a piece of base substrate 200 can be used to make N strips of masking tape, which may be rewound onto N cores to form N rolls of masking tape. This can be done by applying an adhesive to the bottom side of the web of base substrate 200, and then adhering N/2 reinforcing strips 202 of width 2 times W2 (2*W2) parallel to the longitudinal axis 203 of the web of base substrate 200, where W2 is the width of the reinforcing strip to be placed on each strip of base substrate, as shown in FIG. 1. Alternatively the adhesive could be applied to the web of base substrate 200 after the reinforcing strips 202 are attached, or after the strips are cut.

A release coat may be formed on the non-adhesive side of the base substrate 200 and non-adhesive side of the reinforcing strips 202, depending on the materials used.

In general, each reinforcing strip 202 has a fixed width (although it is not essential that it is fixed) of less than Wa, and the reinforcing strips 202 are sized and spaced so that the reinforcing strips 202 do not overlap each other, such as by requiring that the centers of the reinforcing strips are spaced apart by a distance of at least Wa. Neither longitudinal edge of any reinforcing strip 202 should be a distance of less than one half of Wa (Wa/2) from either longitudinal edge 205, 206 of the web of base substrate 200. Preferably the reinforcing strips 202 are regularly spaced so that the centers of the reinforcing strips 202 are spaced apart by 2 times Wa and the centers of the outer reinforcing strips are a distance of Wa from the nearest longitudinal edge 205, 206, as shown in FIG. 7, so that N strips of width Wa will be produced.

N strips of masking tape may then be formed by cutting through the reinforcing strips 202, base substrate 200, and base adhesive layer along N/2 reinforcing strip cut lines 201 and cutting through the base substrate 200 and the base adhesive layer along N/2−1 base substrate cut lines 204. Each cut line runs parallel to the longitudinal axis 203 of the web of base substrate 200. The reinforcing strip cut lines 201 run along the length of each reinforcing strip 202, preferably at the center of each reinforcing strip 202. The base substrate cut lines 204 are positioned between each pair of reinforcing strips 202 located nearest each other, each base substrate cut line 204 being at least a distance of Wa/2 away from the center of any reinforcing strip 202.

Preferably the cut lines are regularly spaced, as shown by the dashed lines 201, 204 in FIG. 7, so that each cut line is separated from the closest other cut line(s) by a distance of Wa, and the outer reinforcing strip cut lines 201 are a distance Wa from the nearest longitudinal edge 205, 206 of the web of base substrate 200. The cutting may be performed, for example, by moving the web of base substrate 200 longitudinally over N−1 blades spaced regularly apart by a distance of Wa. The resulting strips of masking tape may then be rewound onto N cores to form N rolls of masking tape.

It is not essential that the reinforcing strips and cut lines be regularly spaced. If they are not regularly spaced, a total of N strips of multiple widths with an average width of Wa would be produced.

A similar method may be used to produce N rolls of tape where the total width of the reinforcing strips is the same as the total width of base substrate 200. This can be done by adhering a web of reinforcing strip material of the same width as the base substrate 200 to the base substrate 200 to form a combined web, and then moving the combined web over N−1 regularly spaced blades as described above, which create the N strips of tape that can be rewound onto rolls, in addition to N reinforcing strip cutting blades, regularly spaced to align each reinforcing strip cutting blade with the center of one of the strips. The reinforcing strip cutting blades are positioned on the side of the combined web on which the reinforcing strip material is located and are positioned precisely so as to cut fully or substantially through the reinforcing strip material, so that each reinforcing strip is cut into two separate or separable reinforcing strips, but without cutting into the base substrate 200 enough to significantly weaken it.

Another method of producing the masking tape also employs a web of reinforcing strip material of the same width as the base substrate 200. In this method, a web of reinforcing strip material of the same width as the base substrate 200 is first adhered to the base substrate 200, and then the combined web is moved over N−1 regularly spaced blades as described above, which create the N strips of tape that can be rewound onto rolls, in addition to a set of N reinforcing strip cutting blades, regularly spaced to position each reinforcing strip cutting blade at a distance of W2 from a reinforcing strip cut line 201 and spaced apart by Wa. W2 may be as described above in respect of the embodiment shown in FIG. 1, so that it is relatively small compared to W1 which is equal to Wa. In any case, W2 is less than W1/2. The reinforcing strip cutting blades are positioned on the side of the combined web on which the reinforcing strip material is located and are positioned precisely so as to cut fully or substantially through the reinforcing strip material, so that each reinforcing strip is cut into two separate or separable reinforcing strips, but without cutting into the base substrate 200 enough to significantly weaken it. This results in strips of masking tape with the non-adhesive side of the base tape 100 fully covered by reinforcing strip material, with a cut line through the reinforcing strip material closer to one longitudinal edge of the base tape 100 to form a reinforcing strip 101 that acts as does the reinforcing strip 101 shown in FIG. 1 and as described above.

This method can be further extended to add a second set of N reinforcing strip cutting blades, regularly spaced to position each reinforcing strip cutting blade at a distance of W2 from a reinforcing strip cut line 201 and spaced apart by Wa so that the second set of reinforcing strip cutting blades are positioned on the side of each reinforcing strip cut line 201 opposite to that of the first set of N reinforcing strip cutting blades. This results in strips of masking tape with the non-adhesive side of the base tape 100 fully covered by reinforcing strip material, with two cut lines through the reinforcing strip material spaced apart by W2 from each longitudinal edge of the base tape 100 to form two reinforcing strips 101 that each act as does the reinforcing strip 101 shown in FIG. 1 and as described above.

In general, it is not essential that the longitudinal edges of the base tape 100 be straight and parallel to the longitudinal axis 102. For some applications variations may be used to produce a particular effect.

Figure 4:
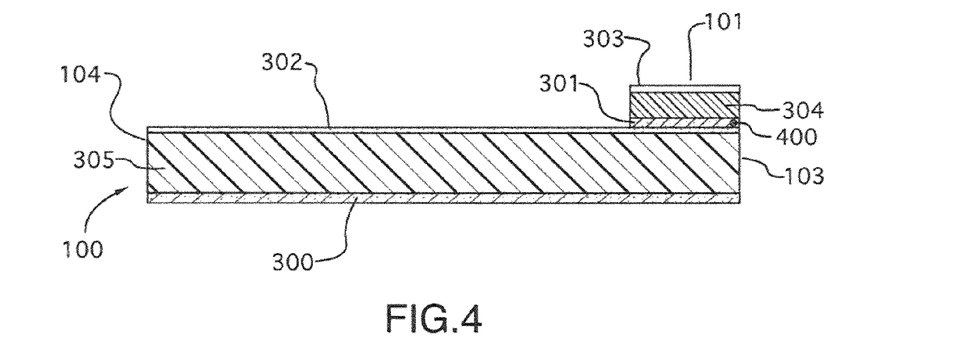
FIG. 4 is a cross-sectional view of a piece of tape having release coats formed on the base substrate and reinforcing strip substrate and having a filament adjacent to the reinforcing strip adhesive layer.

FIG. 4 shows a transverse cross-sectional view of another embodiment of the invention which includes a filament 400 that is releasably secured by the reinforcing strip adhesive layer 301 to the non-adhesive side of the base tape. The filament 400 may be any suitable thread or wire, which may be a braided thread made from a plurality of fine strands, or be a metal wire. The filament could be made from an elastic synthetic material such as a monofilament nylon wire with a diameter, for example, of 0.002 to 0.005 inches. The material and thickness of the filament 400 are selected based on the application for which the associated tape is intended to be used, such that the filament 400 has sufficient tensile strength to cut the coating material it is intended to be used with when such coating is dried or cured.

The filament is positioned as close as practical to the first longitudinal edge 103 of the base tape 100, for example being less than 0.04 inches, and preferably less than 0.01 inches, from the first longitudinal edge 103 of the base tape 100. It may be spaced apart from the first longitudinal edge 103 sufficiently far that it will not become accidentally dislodged while rewinding the tape in the manufacturing process, or prematurely dislodge in the process of applying the making tape to a surface for its intended use.

After the tape is affixed to a surface to be coated, the coating may then be applied to the surface so that it is also applied over the reinforcing strip 101, so that the outer edge of the reinforcing strip 101 along the first longitudinal edge 103 of the base tape 100 is covered with the coating, and the coating may then be allowed to at least partially dry or cure. The filament 400 may then be grasped, for example by a person's fingers, and pulled away from the base tape 100 through the coating to cut through the coating along a longitudinal line (demarcation line), thereby creating a sharp edge to the coating. Because the filament 400 is attached to the to the non-adhesive side of the base tape, its removal does not damage the base tape, which remains affixed to the surface and may be used to apply another coat of the coating material.

This embodiment, employing a filament, is particularly useful in applications requiring a very accurate and precise cut line and/or for cutting through strong coating films that may fracture when cut if a wider strip of tape is removed. When a filament is employed, it is preferred that the reinforcing strip substrate is a relatively strong material, with higher tensile strength than the base substrate, such as plastic film made of polyester, polyolefin, vinyl chloride or nylon. This helps ensure that the filament will not cut through the reinforcing strip, but rather will escape from under the reinforcing strip precisely at the outer longitudinal edge of the reinforcing strip, thereby ensuring a precise cut through the coating and a resulting sharp edge. Since a filament embodiment will not generally be hand tearable, the use of a relatively strong material for the reinforcing strip does not create any additional disadvantage beyond that created by the use of a filament. Generally a user will cut strips of filament-containing tape using scissors, a blade or other cutting means.

Figures 5, 6:
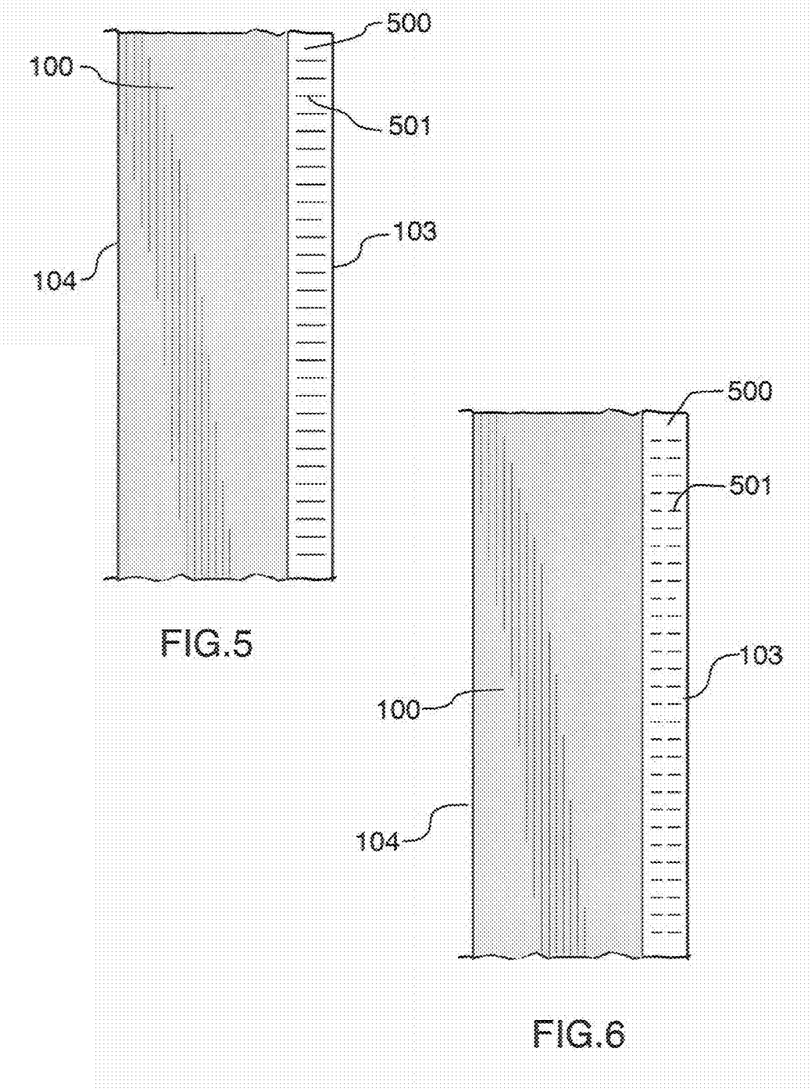
FIG. 5 is a plan view of a strip of an embodiment of the masking tape with transverse slits in the reinforcing strip spaced apart along the length of the tape.
FIG. 6 is a plan view of a strip of an embodiment of the masking tape with pairs of transverse slits in the reinforcing strip spaced apart along the length of the tape.

In other embodiments of the invention, the reinforcing strip 500 has perforations to facilitate hand tearing of the reinforcing strip 500 and base tape together. In the embodiment of the invention shown in FIG. 5, the reinforcing strip 500 has perforations that are transversely oriented slits spaced apart along its length. Alternatively the perforations can, for example, consist of multiple transverse slits adjacent to each other, as shown in FIG. 6, in which pairs of slits are placed side by side at a series of longitudinal positions spaced apart along the length of the reinforcing strip 500. The use of such perforations permits the reinforcing strip 500 to be made of a strong material, such as monoaxially-oriented polypropylene, and still be hand-tearable in the transverse direction, thus making it much easier to use the tape because scissors or another cutting instrument do not need to be used to remove a strip of tape from a roll.

The slits, or other types of transversely placed perforations, are preferably regularly spaced along the length of the reinforcing strip 500 and spaced closely enough in the longitudinal direction that the user can have reasonable control over the length of each strip of tape removed from a roll. For example, the slits 501 may be spaced longitudinally by 0.1 to 0.5 inches, although a larger or smaller spacing could be used.

The transverse extent, or width, of the perforations is generally, but not necessarily, selected to be at least 10% of the width of the reinforcing strip 500 and less than 75% of the width of the reinforcing strip 500, and preferably less than 50% of the width of the reinforcing strip 500, so that there is sufficient un-cut film at each longitudinal position that a strong material, such as monoaxially-oriented polypropylene, retains a sufficiently high tensile strength for cutting through a coating when pulled away from the base tape 100, or away from the surface if the base tape 100 is removed at the same time. In this context, the transverse "width" of the perforations refers to the sum of the width of all perforations located at the same longitudinal position along the tape. For example if two transverse slits 501 are located at the same longitudinal position, as in the embodiment shown in FIG. 6, and the width of each of the slits 501 is 30% of the width of the reinforcing strip 500, then the width of the perforations would be 60% of the width of the reinforcing strip 500 in that embodiment.

Other types of perforations in the reinforcing strip 500 could serve the same function. For example a series of closely spaced pin holes aligned transversely would also be effective and within the scope of the invention.

The perforations are preferably made to be no greater in length or diameter than necessary to weaken the reinforcing strip to be hand-tearable.

In another embodiment, perforations may be made through both the base tape and the reinforcing strip across the width of the tape and spaced apart in the longitudinal direction. In addition to making it easy to hand-tear a strong reinforcing strip, this would allow a user to predictably tear off a strip with the end of the strip being square to the longitudinal edge, which may be important in some masking operations.

In another embodiment, rather than perforations, the reinforcing strip may have transverse scores spaced apart along its length. A score is a cut through the non-adhesive side of the reinforcing strip that does not cut through the full thickness of the reinforcing strip at any point. Depending on the material used for the reinforcing strip substrate, the depth of each score can be selected to be no greater than necessary to weaken the reinforcing strip to be hand-tearable.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

What is claimed is:

1. A masking tape comprising:
   a. an elongated base substrate having top and bottom sides and first and second longitudinal edges;
   b. a base adhesive layer being a pressure-sensitive adhesive layer formed on the bottom side of the base substrate; and
   c. a first reinforcing strip adhered to the top side of the base substrate, the first reinforcing strip having an outer edge, wherein the reinforcing strip has a longitudinal extent co-extensive with that of the base substrate and a width no more than half that of the base substrate, and wherein the reinforcing strip is positioned on the base substrate so that the outer edge of the reinforcing strip is substantially aligned with the first longitudinal edge of the base substrate over the longitudinal extent of the base substrate.

2. The tape of claim 1 wherein the top side of the base substrate has a release coat formed thereon and wherein the reinforcing strip is adhered to the release coat.

3. The tape of claim 1 wherein the outer edge of the reinforcing strip is less than 0.04 inches from the first longitudinal edge of the base substrate.

4. The tape of claim 3 wherein the outer edge of the reinforcing strip is flush with the first longitudinal edge of the base substrate.

5. The tape of claim 1 further comprising a filament having a longitudinal extent co-extensive with that of the base substrate, the filament being positioned between the base substrate and the reinforcing strip so that the filament is substantially aligned with the first longitudinal edge of the base substrate over the longitudinal extent of the base substrate.

6. The tape of claim 5 wherein the filament is less than 0.04 inches from the first longitudinal edge of the base substrate.

7. The tape of claim 6 wherein the filament is a braided thread and has a diameter of 0.002 to 0.005 inches.

8. The tape of claim 1 wherein the reinforcing strip further comprises perforations through the reinforcing strip wherein the perforations are spaced apart in the longitudinal direction so that the tape is hand-tearable.

9. The tape of claim 8 wherein there are at least two perforations at each longitudinal position having a perforation.

10. The tape of claim 8 wherein the perforations have a transverse width of 10% to 50% of the width of the reinforcing strip and are spaced apart longitudinally by 0.1 to 0.5 inches.

11. The tape of claim 1 wherein the reinforcing strip further comprises transverse scores through the top side of the reinforcing strip, the scores being spaced apart along its longitudinal extent, and having a depth sufficient to weaken the reinforcing strip to be hand-tearable.

12. The tape of claim 1 further comprising a second reinforcing strip adhered to the top side of the base substrate, the second reinforcing strip having a longitudinal extent co-extensive with that of the base substrate and a width no more than one-half that of the base substrate, wherein the second reinforcing strip is positioned on the base substrate so that one edge of the second reinforcing strip is substantially aligned with the second longitudinal edge of the base substrate over the longitudinal extent of the base substrate.

13. The tape of claim 1 wherein the thickness of the base substrate is between 0.001 inches and 0.008 inches.

14. The tape of claim 13 wherein the thickness of the base substrate is between 0.002 inches and 0.006 inches.

15. The tape of claim 13 wherein the thickness of the base adhesive layer is between 0.0003 inches and 0.003 inches.

16. The tape of claim 14 wherein the thickness of the base adhesive layer is between 0.0005 inches and 0.002 inches.

17. The tape of claim 1 wherein the thickness of the reinforcing strip is between 0.001 and 0.004 inches.

18. The tape of claim 1 wherein the first reinforcing strip has an adhesive side and a non-adhesive side, and the first reinforcing strip comprises a reinforcing strip substrate layer and a reinforcing strip adhesive layer on the adhesive side for attaching the reinforcing strip to the base substrate, wherein the reinforcing strip is removably adhered to the base substrate.

19. The tape of claim 18 wherein the wherein the reinforcing strip substrate layer comprises plastic film made of polyester, polyolefin, vinyl chloride or nylon.

20. The tape of claim 18 wherein the wherein the reinforcing strip substrate layer comprises monoaxially-oriented polypropylene.

21. The tape of claim 19 wherein the reinforcing strip further comprises perforations through the reinforcing strip substrate layer wherein the perforations are spaced apart in the longitudinal direction so that the tape is hand-tearable.

22. The tape of claim 21 wherein there are at least two perforations at each longitudinal position having a perforation.

23. The tape of claim 21 wherein the perforations have a width of 10% to 50% of the width of the reinforcing strip and are spaced apart longitudinally by 0.1 to 0.5 inches.

24. The tape of claim 19 wherein the reinforcing strip further comprises transverse scores through the non-adhesive side of the reinforcing strip, the scores being spaced apart along its longitudinal extent, and having a depth sufficient to weaken the reinforcing strip to be hand-tearable.

25. The tape of claim 19 wherein the polyester is biaxially-oriented polyethylene terephthalate.

26. The tape of claim 18 further comprising a second reinforcing strip removably adhered to the first reinforcing strip, the second reinforcing strip having a longitudinal extent co-extensive with that of the base substrate, wherein the second reinforcing strip is positioned on the first reinforcing strip so that one edge of the second reinforcing strip is substantially aligned with the first longitudinal edge of the base substrate over the longitudinal extent of the base substrate.

27. The tape of claim 26 wherein the second reinforcing strip has a width less than that of the first reinforcing strip.

28. The tape of claim 1 wherein the materials used to form the base substrate and reinforcing strip are selected so the tape is hand-tearable.

29. The tape of claim 1 wherein the tensile strength of the reinforcing strip is greater than the tensile strength of the base substrate.

30. The tape of claim 1 wherein the width of the reinforcing strip is between 0.03 and 0.5 inches.

31. The tape of claim 30 wherein the width of the reinforcing strip is between 0.06 and 0.125 inches.

* * * * *